United States Patent
Sridharan et al.

(10) Patent No.: US 9,969,648 B2
(45) Date of Patent: May 15, 2018

(54) INDUCTION SEALING OF INORGANIC SUBSTRATES

(75) Inventors: Srinivasan Sridharan, Strongsville, OH (US); George E. Sakoske, Independence, OH (US); Chandrashekhar S. Khadilkar, Broadview Heights, OH (US); Gregory R. Prinzbach, Brecksville, OH (US); John J. Maloney, Solon, OH (US)

(73) Assignee: Ferro Corporation, Mayfield Heights, OH (US)

( * ) Notice: Subject to any disclaimer, the term of this patent is extended or adjusted under 35 U.S.C. 154(b) by 1099 days.

(21) Appl. No.: 14/240,399

(22) PCT Filed: Sep. 12, 2012

(86) PCT No.: PCT/US2012/054709
§ 371 (c)(1),
(2), (4) Date: May 19, 2014

(87) PCT Pub. No.: WO2013/039940
PCT Pub. Date: Mar. 21, 2013

(65) Prior Publication Data
US 2014/0299256 A1    Oct. 9, 2014

Related U.S. Application Data (60) Provisional application No. 61/533,902, filed on Sep. 13, 2011.

(51) Int. Cl.
*C03C 27/10* (2006.01)
*C03C 8/24* (2006.01)
(Continued)

(52) U.S. Cl.
CPC ............ *C03C 27/10* (2013.01); *C03C 8/04* (2013.01); *C03C 8/14* (2013.01); *C03C 8/18* (2013.01);
(Continued)

(58) Field of Classification Search
CPC .. C03C 27/10; C03C 8/04; C03C 8/14; C03C 8/18; C03C 8/22; C03C 8/24; C04B 37/005; C04B 2235/667; C04B 2237/10
See application file for complete search history.

(56) References Cited

U.S. PATENT DOCUMENTS 4,113,896 A * 9/1978 Keiner ................ C04B 35/6269
313/583
6,257,945 B1 * 7/2001 Nakayama ................ H01J 9/40
445/24
(Continued)

FOREIGN PATENT DOCUMENTS

| WO | 00/37362 | 6/2000 |
|---|---|---|
| WO | 2009/086228 A1 | 7/2009 |
| WO | 2013067081 A1 | 5/2013 |

OTHER PUBLICATIONS

International Search Report for corresponding PCT/US2012/054709 dated Dec. 13, 2012, two pages.
(Continued)

*Primary Examiner* — Queenie S Dehghan
(74) *Attorney, Agent, or Firm* — Rankin, Hill & Clark LLP (57) ABSTRACT

A method of sealing at least two inorganic substrates together using an induction energy source comprising applying to at least one of the substrates a paste composition including a glass frit, and an induction coupling additive, bringing at least a second substrate into contact with the paste composition, and subjecting the substrates and paste to
(Continued)

induction heating, thereby forming a hermetic seal between the two inorganic substrates.

16 Claims, 1 Drawing Sheet

(51) Int. Cl.
    *C03C 8/04*     (2006.01)
    *C03C 8/14*     (2006.01)
    *C03C 8/22*     (2006.01)
    *C03C 8/18*     (2006.01)
    *C04B 37/00*     (2006.01)

(52) U.S. Cl.
    CPC ............... *C03C 8/22* (2013.01); *C03C 8/24* (2013.01); *C04B 37/005* (2013.01); *C04B 2235/667* (2013.01); *C04B 2237/10* (2013.01)

(56) References Cited

U.S. PATENT DOCUMENTS

| | | | |
|---|---|---|---|
| 6,387,513 B1 * | 5/2002 | Beyrle | C03C 8/02 427/164 |
| 6,555,025 B1 | 4/2003 | Krupetsky et al. | |
| 6,837,075 B1 | 1/2005 | Snowden et al. | |
| 2004/0232839 A1 * | 11/2004 | Fujitani | C03C 8/14 313/582 |
| 2005/0151151 A1 | 7/2005 | Hawtof et al. | |
| 2005/0242725 A1 | 11/2005 | Hasegawa et al. | |
| 2009/0056798 A1 | 3/2009 | Merchant et al. | |
| 2009/0247385 A1 * | 10/2009 | Ide | C03C 3/066 501/18 |
| 2009/0325349 A1 | 12/2009 | Hashimoto | |
| 2011/0089381 A1 | 4/2011 | Labranche et al. | |
| 2011/0296771 A1 * | 12/2011 | Miller | E06B 3/66342 52/171.3 |
| 2013/0104980 A1 | 5/2013 | Sridharan et al. | |
| 2013/0111953 A1 | 5/2013 | Maloney et al. | |
| 2013/0164466 A1 | 6/2013 | Khadilkar et al. | |
| 2013/0206230 A1 | 8/2013 | Sridharan et al. | |
| 2013/0236662 A1 | 9/2013 | Dua et al. | |
| 2014/0026619 A1 | 1/2014 | Maloney et al. | |

OTHER PUBLICATIONS

Translation of JP S50-159996 published Dec. 24, 1975, six pages.
Machine translation of JP Publication No. 2008-254974 published Oct. 23, 2008, eight pages.
Machine translation of JP Publication No. 2006-335584 published Dec. 14, 2006, 14 pages.
Machine translation of JP Publication No. 2000-128574 published May 9, 2000, 15 pages.

\* cited by examiner

INDUCTION SEALING OF INORGANIC SUBSTRATES

BACKGROUND OF THE INVENTION

1. Field of Invention

The present invention relates to a frit-based hermetic sealing system for glass plates, seal materials, method to apply these seal materials, seal designs for selective and controlled absorption of light to heat and seal the system. These hermetic seals are useful in various applications such as (a) encapsulating solar cells based on silicon, organic systems, and thin film, (b) encapsulating other electronic devices such as organic LEDs (OLED), (c) Vacuum Insulated Glass (VIG) assemblies for windows, (d) touch screen devices and (e) architectural windows and automotive glass based assemblies.

2. Description of Related Art

In many of the practically useful applications of glass to glass sealing, such as encapsulation of solar cells [crystalline silicon as well as thin films based cadmium telluride (CdTe), copper indium gallium selenides (CIGS), polymeric, flexible], OLED packaging, displays, touch screens and Vacuum Insulated Glass (VIG) windows sealing, and architectural & automotive windows sealing, there exists a need to use tempered glasses in many instances. Glasses loose the temper when heated above about 300° C. in conventional furnace firing of sealing glass materials. Therefore, there exists a need to selectively heat the seal material alone and to effect the bonding to the base glasses/substrates without significantly heating the base glasses/substrates. Similarly there exists a need to selectively heat the seal material alone and to effect the bonding to the base glasses/or glass to metal seals without significantly heating the base glasses.

Accordingly, improvements in the art of selective sealing methods such as induction sealing are required.

BRIEF SUMMARY OF THE INVENTION

From the universe of various selective heating techniques such as infrared (IR) heating, induction heating and sealing, laser sealing, microwave heating, and high density plasma arc lamp sealing, induction heating offers heating rates up to 1000° C./sec (compared to 6 to 10° C./sec slow heating of glass in conventional ovens) coupled with excellent penetration depth at low frequencies such as 80 KHZ, or generally 60-350 KHZ, where industrial/commercial induction ovens operate. Therefore, induction heating and sealing can offer unique advantages including selectively heating a thicker layer of seal materials. Since many of these sealing applications-especially vacuum insulated window sealing & solar cells encapsulation or OLED sealing applications— require a thicker seal material (over 20 microns)—volumetric heating techniques such as induction heating becomes a preferred method of sealing. The invention relates to the use of induction sealing of inorganic substrates to one another, including glass to glass seals, glass to metal utilizing both tempered as well as annealed glass substrates.

An embodiment of the invention is a method of sealing at least two inorganic substrates together using an induction energy source comprising: (a) providing at least two inorganic substrates; (b) applying to at least one of the at least two second substrates a paste composition including: (i) a glass frit, and (ii) an induction coupling additive, and (c) bringing at least a second substrate into contact with the paste composition, and (d) subjecting the substrates and paste to Induction heating, thereby forming a hermetic seal between the two inorganic substrates.

An embodiment of the invention is a lead-free and cadmium-free sealing glass frit composition, comprising, prior to firing, (a) 25-65 mol % $Bi_2O_3$, (b) 3-60 mol % ZnO, (c) 4-65 mol % $B_2O_3$, (d) 0.1-15 mol % of at least one selected from the group consisting of CuO, $Fe_2O_3$, $Co_2O_3$, $Cr_2O_3$, and combinations thereof, (e) no intentionally added oxides of silicon, and (f) no intentionally added oxides of aluminum.

An embodiment of the invention is a method of sealing a solar cell module in a glass cylinder comprising: (a) positioning a plurality of solar cells in electrical contact with one another inside a glass cylinder, (b) applying any sealing glass frit composition disclosed herein to at least one of the glass cylinder and a conductive metal endcap designed to fit over the end of the cylinder (c) bringing the cylinder end, the glass sealing composition and endcap into physical contact with one another, and (d) subjecting the seal to induction heating at a power of from 1 watt to 300 kW to sinter and flow the glass frit composition to thereby form a hermetic seal.

An embodiment of the invention is a solar cell module comprising a glass cylinder having a transmittance of greater than 80% at 550 nm, in which are situated a plurality of silicon solar cells in electrical contact with one another and a conductive metal endcap, the endcap hermetically sealed to the cylinder by induction heating of a portion of any sealing glass frit composition disclosed herein.

An embodiment of the invention is a method of sealing a solar cell module comprising: (a) providing at least two glass plates, (b) positioning a plurality of solar cells in electrical contact with one another and in between these two glass plates, (c) applying any glass frit composition disclosed herein to at least one of the glass plates, (d) bringing at least a second glass plate, gall composition disclosed herein and the top glass plate into physical contact with one another, and (e) subjecting the seal to induction heating at a power of from 1 watt to 300 kW to sinter and flow the glass frit composition to thereby form a hermetic seal.

An embodiment of the invention is a method of sealing a VIG assembly comprising: (a) providing at least two glass plates (b) applying any glass frit composition disclosed herein to at least one of the glass plates, (b) bringing at least a second glass plate, into contact with the applied glass frit composition and (d) subjecting the glass frit composition to induction heating at a power of from 1 watt to 300 kW to sinter and flow the glass frit composition to thereby form a hermetic seal.

An embodiment of the invention is a method of sealing electronic devices such as LED, OLED, displays or other electronic circuits assembly comprising: (a) providing at least two glass plates (b) applying any glass frit composition disclosed herein to at a first of the glass plates, (c) placing an electronic device into a cavity formed by the at least first of the glass plates and the glass frit composition, (d) bringing at least a second glass plate into contact with the glass frit composition, and (e) subjecting the glass frit composition to induction heating at a power of from 1 watt to 300 kW to sinter and flow the glass frit composition to thereby form a hermetic seal.

An embodiment of the invention is a method of sealing an assembly comprising: (a) providing at least two glass plates (b) applying any glass frit composition disclosed herein to at a first of the glass plates, (c) placing the assembly into a cavity formed by the at least first of the glass plates and the glass frit composition, (d) bringing at least a second glass plate into contact with the glass frit composition, and (e) subjecting the glass frit composition to induction heating at a power of from 1 watt to 300 kW to sinter and flow the glass frit composition to thereby form a hermetic seal. An embodiment of the invention is a method of sealing an assembly used in automotives comprising: (a) providing at least two glass plates (b) applying any glass fit composition disclosed herein to at least one of the glass plates, (b) bringing at least a second glass plate, glass frit composition disclosed herein and the top glass plate into physical contact with one another, and (d) subjecting the seal to induction heating at a power of from 1 watt to 300 kW to sinter and flow the glass frit composition to thereby form a hermetic seal.

An embodiment of the invention is a method of sealing an assembly in buildings, such as smart windows, comprising: (a) providing at least two glass plates (b) applying any glass frit composition disclosed herein to at least one of the glass plates, (b) bringing at least a second glass plate, glass frit composition disclosed herein and the top glass plate into physical contact with one another, and (d) subjecting the seal to induction heating at a power of from 1 watt to 300 kW to sinter and flow the glass frit composition to thereby form a hermetic seal.

An embodiment of the invention is a method of bonding first and second glass panels to one another, so as to hermetically seal and isolate a cavity defined therebetween, the method comprising, (a) providing a first homogeneous powder glass sealing composition comprising: (i) 25-65 mol % $Bi_2O_3$, (ii) 3-60 mol % ZnO, (iii) 4-65 mol % $B_2O_3$, (iv) no intentionally added oxides of silicon, and (v) no intentionally added oxides of aluminum, (b) providing a second homogeneous powder glass sealing composition comprising: (i) 37-45 mol % $Bi_2O_3$, (ii) 30-40 mol % ZnO, (iii) 18-35 mol % $B_2O_3$, (iv) 0.1-15 mol % of at least one selected from the group consisting of CuO, $Fe_2O_3$, $CO_2O_3$, $Cr_2O_3$, (v) no intentionally added oxides of silicon, and (vi) no intentionally added oxides of aluminum (c) mixing the first and second powders form a homogeneous mixture, (d) applying the homogeneous mixture to at least one of the first and second glass plates, (e) positioning the first and second glass plates such that the first and second powders come into contact with both glass plates, (f) subjecting the glass plates and powders to induction heating with an electromagnetic field having a frequency of 60 to 350 kHz, to sinter and flow the first and second powders thereby forming a hermetic seal defining a cavity between the first and second plates.

An embodiment of the invention is a lead-free and cadmium-free sealing glass frit composition, comprising, prior to firing, (a) 5-65 mol % ZnO, (b) 10-65 mol % $SiO_2$, (c) 5-55 mol % $B_2O_3+Al_2O_3$, (d) 0.1-45 mol % of at least one selected from the group consisting of $Li_2O$, $Na_2O$, $K_2O$, $Cs_2O$, and combinations thereof, (e) 0.1-20 mol % of at least one selected from the group consisting of MgO, CaO, BaO, SrO and combinations thereof, and (f) 0.1-40 mol % of at least one selected from the group consisting of $TeO_2$, $Tl_2O$, $V_2O_5$, $Ta_2O_5$, $GeO_2$ and combinations thereof.

Another embodiment of the invention is a lead-free and cadmium-free sealing glass fit composition, comprising, prior to firing, (a) 5-55 mol % $Li_2O+Na_2O+K_2O$, (b) 2-26 mol % $TiO_2$, (c) 5-75 mol % $B_2O_3+SiO_2$, (d) 0.1-30 mol % of at least one selected from the group consisting of $V_2O_5$, $Sb_2O_5$, $P_2O_5$, and combinations thereof, (e) 0.1-20 mol % of at least one selected from the group consisting of MgO, CaO, BaO, SrO, and combinations thereof, (f) 0.1-40 mol % of at least one selected from the group consisting of $TeO_2$, $Tl_2O$, $Ta_2O_5$, $GeO_2$ and combinations thereof, and (g) 0.1-20 mol % F.

Still another embodiment of the invention is a method of sealing an assembly comprising: (a) providing at least two glass plates where in at least one glass plate is a smart glass (b) applying a glass frit composition to at least a first of the glass plates; (c) bringing at least a second glass plate into contact with the glass frit composition, and (d) subjecting the seal to induction heating at a power of from 1 watt to 300 kW to sinter and flow the glass frit composition to thereby form a hermetic seal.

Yet another embodiment of the invention is a method of forming a hermetic seal between two inorganic substrates comprising: (a) applying to a first inorganic substrate a paste composition including a glass frit, (b) positioning a wire within the paste composition, (c) bringing at least a second in substrate into contact with the paste composition, and (d) subjecting the wire to resistive heating thereby sintering and flowing the paste composition and forming a hermetic seal between the two inorganic substrates.

Another embodiment of the invention is a method of forming a hermetic seal between two inorganic substrates comprising: (a) applying to a first inorganic substrate a paste composition including a glass fit and an induction coupling additive, (b) positioning a circuit feedthrough within the paste composition, (c) bringing at least a second substrate into contact with the paste composition, and (d) subjecting the paste to inductive heating thereby sintering and flowing the paste composition and forming a hermetic seal between the two inorganic substrates.

Still another embodiment of the invention is a method of forming a hermetic seal between two inorganic substrates comprising: (a) applying to a first inorganic substrate a paste composition including a glass frit, (b) the glass frit is a multi layer functional gradient seal glass system (c) bringing at least a second in substrate into contact with the paste composition, and (d) subjecting the wire to resistive heating thereby sintering and flowing the paste composition and forming a hermetic seal between the two inorganic substrates.

DETAILED DESCRIPTION OF THE INVENTION

Broadly in selective sealing methods localized heating occurs due either to preferential absorption of electromagnetic waves of interest or selective inducement of eddy currents near the seal, due to the presence of suitable absorbers, or couplers in the seal materials. This leads to selective heating of seals. Control of various aspects of this selective sealing method such as: amount and location of absorption and heat generation; control of heat dissipation to minimize the occurrence of thermal gradients or thermal shock—through materials and seal designs, especially for one such selective sealing method—Induction Sealing—are other aspects of the invention.

The invention involves controlling the amount of induced eddy currents, the location of the deposition of this energy, and the rate of deposition of this energy, so that a high quality seal is formed, eliminating fractures due to thermal shock and thermal expansion mismatches that would compromise the hermeticity of the seal are prevented or minimized.

The method for forming hermetic seals according to this invention is simple in concept, but quite difficult to achieve in practice. The formation of a hermetic seal requires near perfection since even a single gap or leak in a large solar module or VIG panel, which may be on 0.8 m×1.2 m to 2 m×3 m glass substrates, compromises the seal and lifetime of the solar module or loss of insulating power of VIG unit. The sealing glass or enamel can either be preglazed (or prefired) on the glass plates before induction sealing the glass plates together, or directly sealed without preglazing. It should be appreciated that bubbles present in an enamel or that may form during the sealing operation will expand in size during the heating, forming larger voids that could compromise the integrity of the seal. Therefore depending on the seal geometry and glass plates sizes the enamel layer can either be preglazed or not.

In principle, this invention entails minimizing any dimensional changes, depositing the majority of the energy at the site of the interface to be sealed, controlling and minimizing average bubble sizes and then minimizing any thermal gradients and expansion mismatches to minimize the chance for fractures from thermal shock or thermal expansion mismatch.

The dimensional changes are primarily eliminated by the use of fired (preglazed) enamels that have been densified/sintered from dried depositions having bulk densities of about 60% or less of their theoretical density, to fired enamels with at least 90% of theoretical density. However, it should also be recognized that bonding a substrate having a preglazed enamel to one with a thin layer of dried enamel paste would give only minor dimensional changes and would work nearly as well, and is also part of this invention Another purpose of the preglazed fired enamels on substrates is to create high-quality enamel-substrate interfaces.

Another embodiment of the invention concerns controlling the location of energy deposition. In induction sealing high frequency electromagnetic fields of high intensity are created by generators operating up to 300 KW power, for example 1 watt to 300 KW, 10 watts to 200 KW or 100 watts to 100 KW and at frequencies typically 60-350 KHZ and at high voltages such as 460V AC, such as 1-600V, 10-500V, or 200-460 V. Induction heating may provide a heat flux of 0.1 to 15 kW per square centimeter. The heating rate of at least a portion of the substrates and paste may be 0.1 to 10,000° C. per second.

The heating of the seal will be either direct joule heating of the seal material or by joule heating of the metallic material and then conduction of this heat to the seal (or enamel) for melting. Therefore, additions of coupling materials of reasonably resistive metallic materials (heating by R term in I**2×R) such as various steels, Sn, W, Mo, Nichrome, Kovar, Fe—Ni alloys, Ni, $MoSi_2$ or highly conductive material ((heating by I term) such as graphite, Cu, Ag to the seal glass material is envisioned to provide the localized induction heating.

Still another embodiment of the invention relates to shape and size of these coupling agents. In many materials subjected to induction current tends to flow at the surface, especially at higher frequencies, due to skin effect. Therefore to effect volumetric heating in seal glass material, addition of coupling materials which are particulates having shapes selected from the group consisting of high sphericity, low sphericity, irregular, equant, ellipsoidal, tabular, cylindrical, flake, whisker and wire geometries, is envisioned, to generate the heat throughout the seal. The $D_{50}$ particle size can be in the range of 5 nm to 100,000 nm, preferably 10 nm to 50,000 nm, more preferably 50 nm to 10,000 nm.

Still another embodiment of the invention relates to additions of magnetic materials. For example ferrites such as Ni—Zn ferrites, Mn—Zn ferrites, Mg—Mn ferrites, ferritic stainless steels such as 430 stainless steel powders, ferrimagnetic materials such as $Fe_3O_4$, glasses and glass-ceramics containing $Fe_2O_3$ or $Co_2O_3$ or MnO other additive oxides that could precipitate either magnetic crystals such as $Fe_3O_4$, or $MgO_{0.5}MnO_{0.5}Fe_2O_3$ in glasses. Additionally the paste may further comprise a manganese-containing constituent selected from the group consisting of bismuth manganese pigments, perovskite manganites, $Bi_2Mn_4O_{10}$, $Bi_{12}MnO_{20}$ and a bismuth-manganese pigment having a mole ratio of $Bi_2O_3$ to $MnO_2$ of 5:1 to 1:5. These can be added in many different forms either as part of a glass frit composition or as separate additions in forms such as powder or whisker or wire or flake. Here the heating is due, in addition to joule heating, to frictional heating of turning domain walls on application of high frequency current below the Curie temperature.

Yet another embodiment of the invention relates to preventing stresses that would weaken the seal and preventing fractures that would compromise the hermeticity of the seal. This is done by controlling the composition of the enamel and the parameters of the sealing technique. Although it is not a requirement for the use of this invention, the use of preglazed enamels is extremely helpful for forming high-quality hermetic seals. The use of dried enamels for the sealing step results in significant dimensional changes when the coating has a substantial thickness, making formation of the seal more difficult. In addition, the dried enamels are prone to form large voids in the seal, and also tend to blow some contamination to the inside of the cell module or VIG panel during the sealing method.

Another embodiment of this invention is addition of these coupling materials to low temperature seal glass materials disclosed in commonly owned copending PCT/US2011/032689, incorporated by reference, and further developed to commercial materials such as EG2824, EG2824B and EG2824G from Ferro Corporation, Cleveland, Ohio. The seal glass materials stated here, are not limited to high bismuth glasses alone. We envision additions of these coupling materials to different seal glass systems, namely high lead glass seal materials based on low melting lead glasses such as EG2760; zinc glass systems such as CF7574, LF256; bismuth zinc borate glasses such as EG2871; high barium glasses; high calcium glasses; alkali silicate glasses containing titanium and/or zinc such as EG3600, EG3608. The above named glasses are commercially available from Ferro Corporation, Cleveland Ohio and are broadly disclosed in the following tables.

TABLE 1

Broad ranges for individual oxides to be used in sealing glass frits.
The glass frits broadly have softening points of 250 to 800° C.

| Oxide (Mole %) | 1-1 | 1-2 | 1-3 | 1-4 | 1-5 |
|---|---|---|---|---|---|
| $Bi_2O_3$ | 25-65 | 30-60 | 32-55 | 35-50 | 37-45 |
| ZnO | 3-60 | 10-50 | 15-45 | 20-40 | 30-40 |
| $B_2O_3$ | 4-65 | 7-60 | 10-50 | 15-40 | 18-35 |
| $SiO_2$ & $Al_2O_3$ | No intentional additions | | | | |
| MgO | No intentional additions | | | | |
| ZrO2 | No intentional additions | | | | |
| $CeO_2$ | No intentional additions | | | | |

TABLE 1-continued

Broad ranges for individual oxides to be used in sealing glass frits.
The glass frits broadly have softening points of 250 to 800° C.

| Oxide (Mole %) | 1-1 | 1-2 | 1-3 | 1-4 | 1-5 |
|---|---|---|---|---|---|
| Refractory oxides | No intentional additions | | | | |
| PbO and CdO | No intentional additions | | | | |

TABLE 2

Ranges for individual additional oxides to be
used in sealing glass frits in minor amounts.

| | Alternative Oxide Ranges (Mole %) | | | | | |
|---|---|---|---|---|---|---|
| | 2-1 | 2-2 | 2-3 | 2-4 | 2-5 | 2-6 |
| $K_2O$ | 0-15 | 0.1-10 | 0.5-8 | 1-7 | 1.5-5 | 2-4 |
| $Li_2O$ | 0-15 | 0.1-10 | 1-9.5 | 2-9 | 3-8 | 4-8 |
| $La_2O_3$ | 0-15 | 0.1-10 | 1-9 | 2.5-7 | 3-6 | 3.5-5 |
| $Fe_2O_3$ | 0-15 | 0.1-10 | 0.5-8 | 1-7 | 2-6 | 4-5.5 |
| CuO | 0-15 | 0.1-10 | 2-9.5 | 3-9 | 5-8.5 | 6-8.5 |
| $Co_2O_3$ | 0-15 | 0.1-10 | 2-9.75 | 4-9.5 | 6-9 | 7.5-9 |
| MnO | 0-15 | 0.1-10 | 1.5-9 | 2-8 | 4-7 | 4-7 |
| MO | 0-15 | 0.1-10 | 1.5-9 | 2-8 | 4-7 | 4-7 |
| $(Ta_2O_5 + P_2O_5 WO_3 + MoO_3 + SnO)$ | 0-10 | 0-8 | 0-6 | 0.1-5 | 0.1-4 | 0.1-4 |
| $(TeO_2 + Tl_2O + V_2O_5 + GeO_2)$ | 0-40 | 0-30 | 0-20 | 0.1-30 | 0-10 | 0.1-15 |
| $F_2$ | 0-15 | 0-10 | 0-8 | 1-6 | 2-6 | 2-6 |

Alternative ranges for individual additional oxides in Table 2 include, for CuO, $Fe_2O_3$, $Co_2O_3$, and MnO, in mol %:1.5-9, 2-8 and 4-7. Alternate ranges for $La_2O_3$ include 0.5-8, 2-6 and 1-6 mol %.

Oxides in tables 2 or 4, including the alternatives in the preceding paragraph, can be used in any amount disclosed in any column together with oxides from table 1 or 3. Amounts from different columns in tables 2 or 4 can be used with amounts of oxides from any column in table 1 or 3.

It is to be noted that part of these glass oxides such as $Bi_2O_3$, ZnO, CuO, $Fe_2O_3$, $Co_2O_3$, MnO, can be included as ceramic oxide additives in the seal materials to obtain the final overall glass frit compositions envisioned here.

As mentioned previously multiple glasses, preferably glass mixtures of two or three frits can be used to control the overall properties of the seal. If a second glass frit composition is used, the proportions of the glass frit compositions can be varied to control the extent of paste interaction with substrates such as silicon, flow and crystallization characteristics of the seal and hence the resultant seal properties. For example, within the glass component, the first and second glass frit compositions may be present in a weight ratio of about 1:20 to about 20:1, and preferably about 1:5 to about 5:1. The glass component preferably contains no lead or oxides of lead, and no cadmium or oxides of cadmium. However, in certain embodiments where the properties of PbO cannot be duplicated, such embodiments advantageously comprise PbO. Further the second or third glass can be another bismuth glass from Tables 1 & 2, or a zinc glass (Table 3) or alkali titanium silicate glass (Table 4) or a lead glass (Table 5 or 6).

TABLE 3

Oxide frit ingredients for zinc based additive glasses in mole percent.

| | Glass Frit Composition | | |
|---|---|---|---|
| Ingredient [Mole %] | 3-1 | 3-2 | 3-3 |
| ZnO | 5-65 | 7-50 | 10-32 |
| $SiO_2$ | 10-65 | 20-60 | 22-58 |
| $(B_2O_3 + Al_2O_3)$ | 5-55 | 7-35 | 10-25 |
| $(Li_2O + Na_2O + K_2O + Cs_2O)$ | 0-45 | 2-25 | 1-20 |
| $(MgO + CaO + BaO + SrO)$ | 0-20 | 0-15 | 0-10 |
| $(TeO_2 + Tl_2O + V_2O_5 + Ta_2O_5 + GeO_2)$ | 0-40 | 0-30 | 0-15 |

TABLE 4

Oxide frit ingredients for alkali-titanium-silicate
additive glasses in mole percent.

| | Glass Frit Composition | | |
|---|---|---|---|
| Ingredient [Mole %] | 4-1 | 4-2 | 4-3 |
| $Li_2O + Na_2O + K_2O$ | 5-55 | 15-50 | 30-40 |
| $TiO_2$ | 2-26 | 10-26 | 15-22 |
| $B_2O_3 + SiO_2$ | 5-75 | 25-70 | 30-52 |
| $V_2O_5 + Sb_2O_5 + P_2O_5$ | 0-30 | 0.25-25 | 5-25 |
| $MgO + CaO + BaO + SrO$ | 0-20 | 0-15 | 0-10 |
| $(TeO_2 + Tl_2O + Ta_2O_5 + GeO_2)$ | 0-40 | 0-30 | 0-20 |
| F | 0-20 | 0-15 | 5-13 |

TABLE 5

Oxide frit ingredients for lead based additive glasses in mole percent.

| | Glass Frit Composition | | |
|---|---|---|---|
| Ingredient [Mole %] | 5-1 | 5-2 | 5-3 |
| PbO | 15-75 | 25-66 | 50-65 |
| $B_2O_3 + SiO_2$ | 5-75 | 20-55 | 24-45 |
| ZnO | 0-55 | 0.1-35 | 0.1-25 |
| $(Li_2O + Na_2O + K_2O + Cs_2O)$ | 0-40 | 0-30 | 0-10 |
| $TiO_2 + ZrO_2$ | 0-20 | 0-10 | 0.1-5 |
| $(MgO + CaO + BaO + SrO)$ | 0-20 | 0-15 | 0-10 |
| $(TeO_2 + Tl_2O + V_2O_5 + Ta_2O_5 + GeO_2)$ | 0-40 | 0-30 | 0-15 |
| $F_2$ | 0-15 | 0-10 | 0-8 |

TABLE 6

Oxide frit ingredients for lead vanadium based
additive glasses in mole percent.

| | Glass frit Composition | | |
|---|---|---|---|
| Ingredient [Mole %] | 6-1 | 6-2 | 6-3 |
| PbO | 1-90 | 10-70 | 20-40 |
| $V_2O_5$ | 1-90 | 10-70 | 25-65 |
| $P_2O_5$ | 5-80 | 5-40 | 5-25 |
| $B_2O_3 + SiO_2$ | 0-20 | 0-10 | 0-5 |
| $(Li_2O + Na_2O + K_2O + Cs_2O)$ | 0-40 | 0-30 | 0-10 |
| $(MgO + CaO + BaO + SrO)$ | 0-20 | 0-15 | 0-10 |
| $(TeO_2 + Ta_2O_5 + Tl_2O + GeO_2)$ | 0-40 | 0-30 | 0-15 |
| $F_2$ | 0-15 | 0-10 | 0-8 |

Sealing glass frit compositions of the invention can be lead-free and cadmium free. In one embodiment, the lead-free and cadmium-free sealing glass frit composition, comprises, prior to firing, (a) 25-65 mol % $Bi_2O_3$, (b) 3-60 mol % ZnO (c) 4-65 mol % $B_2O_3$, (d) 0.1-15 mol % of at least one selected from the group consisting of CuO, $Fe_2O_3$, $CO_2O_3$, $Cr_2O_3$, and combinations thereof, (e) no intentionally added oxides of silicon, and (f) no intentionally added oxides of aluminum.

In addition to other embodiments, the glasses used in the invention may be selected from the group consisting of bismuth glass, lead glass, zinc glass, barium glass, calcium glass, alkali silicate glasses, vanadium glass, telluride glass, phosphate glass and combinations thereof.

Yet another embodiment of this invention is adding these coupling materials to epoxies as well organic-inorganic hybrid materials to effect the heating, flowing and bonding of substrates glass to glass, glass to metal, and glass to ceramic sealing.

Yet another embodiment of this invention is at least one of the glass plate is tempered.

Yet another embodiment of this invention is at least one of the glass plate is a pre laminated glass assembly.

Yet another embodiment of this invention is at least one of the glass plate is coated with conductive coatings such as tin oxide (TCO) or indium-tin oxide (ITO) material.

Yet another embodiment of this invention is other enamels or pastes are fired along with the sealing glass or enamel layers of this invention.

Yet another embodiment of this invention is an exact feed through is incorporated on glass plates and is either sealed together with, or separately from, seal enamel firing.

Yet another embodiment of this invention is a conductive feed through is incorporated either on glass plates or as part of the seal assembly to provide or take out power into or away from the components inside the seal cavity.

Broadly, a method of induction sealing begins with pre-firing an induction coupling containing enamel composition on a top glass plate. Then the top plate is placed over the bottom plate. Then an induction source is targeted to the assembly, to melt the top surface of the energy absorbing/coupling enamel and bond the pieces together.

Alternately, induction coupling containing enamels are prefired to each of top and bottom glass plates. Then the plates are placed together and subject to heating by an induction source to complete the seal.

Prefiring eliminates the need to method a large mass of sealing material in a solar cell fabrication facility, and prevents excess heating of the photovoltaic device. For the final sealing fire, contamination from binder burnout is eliminated, as no organic binder is needed. In the aggregate, the sealing method carried out by the procedures outlined herein is faster than conventional methods, largely because the prefiring reduces the mass of frit that must be fired at the moment of seal formation.

Although prefired enamel layers before induction sealing is preferred, it is also envisioned that direct sealing without prefiring is possible.

Similarly it is envisioned that sealing materials (enamel layers) can all be applied to the same plate (top or bottom) and selectively sealed to the other plate with or without prefiring the enamel.

Various embodiments of the invention may involve various procedures for application of induction coupling enamel layers. The application procedures may include one or more of screen printing, paste extrusion, ink jet printing, digital application procedures using ink jet or spray deposition, automatic syringe dispensing such as by the use of Nordson robotic dispenser systems, spin coating, dip coating and others.

Yet another embodiment of the invention is the sealing of glass to metal in applications such as one or more solar cells encapsulated in one or more cylindrical glass tubes sealed at the ends with metal caps using induction sealing of these materials. In such glass to metal sealing applications the addition of coupling materials to seal glass material is optional as the metallic member itself can be heated well under induction and the heat is transferred through conduction into the seal material.

The design of induction heating coil is the key for successful selective heating of seals. Therefore specific designs are envisioned for such coils for specific part and seal geometries as well as for specific seal glass materials systems.

An embodiment of the invention is a method of hermetically sealing a conductive feed through comprising: (a) applying to a first substrate a first enamel trace parallel to the substrate edge, (b) applying a second enamel trace which contains a conductor across the first enamel trace such that it contacts the first substrate in the area adjacent both edges of the first enamel, (c) applying a third enamel trace parallel to the substrate edge substantially over the first enamel trace, and (d) heating the respective enamels.

Another embodiment of the invention is a sealant material system for use in joining two or more inorganic substrates that are used to form a photovoltaic device, said sealant material system comprising one or more glass or ceramic components. The sealant material system may include any glass and/or metal and/or oxide in any combination, disclosed herein.

In any embodiment herein, a vacuum or inert atmosphere may be sealed in a space created by the at least two inorganic substrates together with the sealant material system.

An embodiment of the invention is a sealant material system for use in joining two or more inorganic substrates contained in a photovoltaic device upon application of a concentrated energy source. The sealant material system may include any glass and/or metal and/or oxide in any combination, disclosed herein.

An embodiment of the invention is a multi-cell solar array comprising a plurality of individually hermetically sealed solar cells. In many of the practically useful applications of glass to glass sealing, such as encapsulation of solar cells (crystalline silicon as well as thin films based CdTe & CIGS, polymeric, flexible), OLED packaging, displays, and vacuum insulated windows sealing, and architectural & automotive windows sealing, there exists a need to use tempered glasses in many instances. Soda-lime silica glass substrates loose their temper when heated above about 300° C. in conventional furnace firing of sealing glass materials. Therefore, there exists a need to selectively heat the seal material alone and to effect the bonding to the base glasses/substrates without significantly heating the base glasses/substrates.

Envisioned herein is the use of products made by Induction heating systems industry leaders such as ABP Induction LLC, 6600 Burroughs Avenue, Sterling Heights Mich. 48314 and its parent company, Pillar Induction, 21095 Gateway Road, Brookfield Wis. 53045, as they have unique experience in induction heating technology, which employs high frequency concentrated Induction applicator to melt glasses.

Thus, the present invention contemplates the following also: 1. A hermetic bead type of seal with a central wire that can be inductively heated from the inside out. 2. Hermetic bead type seal with a thermal expansion gradient composition of materials to reduce expansion mismatches. 3. Hermetic bead type seals with induction/radiation/thermal conduction materials in gradient composition so as to design and control heating rates and temperature gradients in the seal and at the substrate interface during the sealing method. 4. Foil and/or planar type hermetic seal geometries and gradient compositions as in 1-3 above. 5. Seal geometries with conductive circuit feed-throughs. 6. Hermetic seal geometries with vacuum exhaust feed-throughs. 7. Glass substrates for sealing with sealing materials pre-fired during glass substrate tempering or annealing method. 8. Digital application (such as ink jet printing) of materials and gradient materials for forming hermetic seals.

Figure 1:
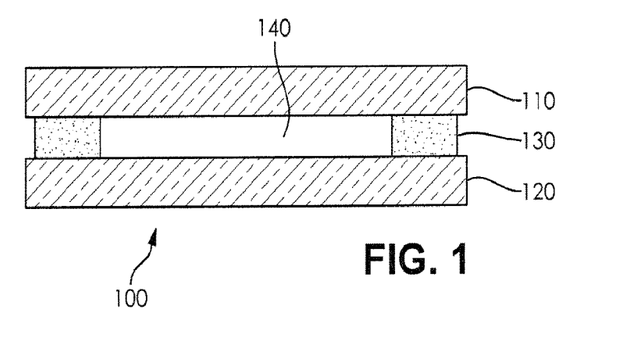
FIG. 1 depicts a simple inductively fused seal between two glass plates.
Figure 2:
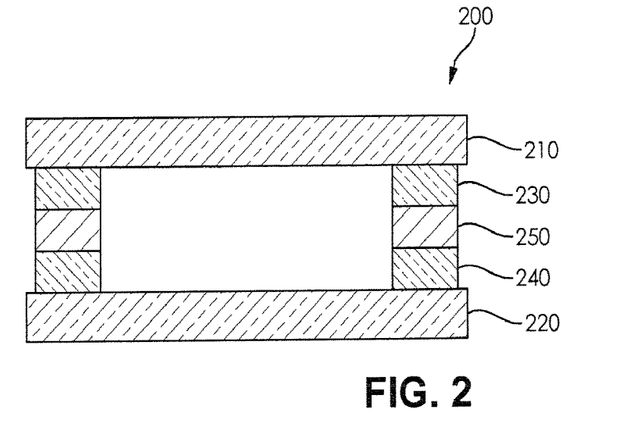
FIG. 2 depicts an inductively fused seal with a metallic interlayer.
Figure 3:
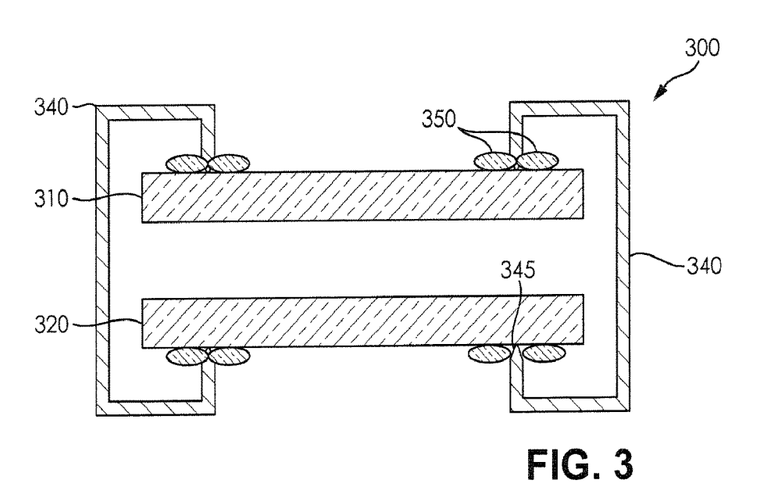
FIG. 3 depicts an inductively fused glass seal with metal sleeve to effect glass to metal seals.

The present invention contemplates three different designs as shown in FIGS. 1 to 3, for induction sealing of glass plates. In FIG. 1 it is a simple seal between two glass plates. In FIG. 2 the seal has a metallic interlayer. In FIG. 3 the outer metal piece is inductively heated to effect glass to metal seals.

In particular, FIG. 1 depicts an embodiment with glass plates 110 and 120 joined by a green inductive sealing glass 130 (seal glass and induction coupling additive) to form assembly 100. Assembly 100 is subjected to heating which fuses the glass in seal 130 to a solid hermetic seal. Cavity 140 may house an active layer (not shown) or a special atmosphere, such as an inert atmosphere, such as $N_2$, He, Ar, or a partial vacuum, to a pressure of 500 torr, 400 torr, 300 torr, 200 torr, or even 100 torr, to the hermeticity limit of the sealant material used to seal the glass plates 110 and 120 together.

Referring now to FIG. 2, two glass plates 210 and 220 are sealed by glass seals 230 and 240 between which is sandwiched metal foil 250. Glass seals 230 and 240 are applied to glass plate 210 and glass plate 220 respectively. Metal foil 250 can be applied to either glass seal. The metal foil is sealed to the glass by expansion matched or expansion graded low temperature sealing glass. The metal may be Al, stainless steel, low carbon steel, or Fe—Ni alloys. Sealing between metal and glass is achieved by any sealing glass of the invention.

In an alternate embodiment metal 250 is heated by induction and the heat transferred to the sealing glass. Bonding is effected by melting of seal glass at the metal/seal glass interface. The metal is resistively heated by induced current. In this embodiment, the metal need not be a distinct layer, but, for example, could be wire(s) distributed within the seal glass. In such a case, layers 230 and 240 together conceptually would be a single layer with one or more wires through it.

In FIG. 3, glass plate 310 is sealed together with glass plate 2 by metal sleeves 340. Metal sleeves 340 contact glass plates 310 and 320 by chamfered ends 345 to ensure minimal contact between metal and glass plates and to minimize shear stress buildup at the interface. The shear failure of glass is thus minimized. Beads of sealing glass 350 are applied to the inside and outside of junctions of metal sleeve 340 and glass plates 310 and 320.

Sealing glass 350 can be any glass disclosed herein. It is heated by (a) heat transferred from induction heating of the metal sleeve, (b) selective heating of glass by laser or broadband plasma arc lamp or (c) induction heating of seal glass itself by the presence of induction coupling additives.

In a preferred embodiment the sealing glass can be prefired onto the metal sleeve and the seal can be bonded to the glass plates 310 and 320 by fast induction heating.

In conventional furnace sealing, heat from an oven or visible light source is used to fuse the glass in a seal. If, for example the desired set point temperature is 500° C., the temperature precision may be as close as ±10 to 20° C., with minor, if any, temperature gradients. The temperature homogeneity within the fired article can also be maintained at +10 to 20° C. This method is slow, with heating to fusion requiring perhaps 10 minutes to an hour.

Embodiments of this invention can provide a sealed cavity to encapsulate different display electronics such as LEDs, OLEDS for localized heating and sealing without unduly heating the electronics inside. Yet other embodiments involve providing a hermetic seal between glass plates to hold vacuum or certain gas atmospheres, including inert, for building windows.

The substrates may be the same or different, and may be selected from among glass, conductive oxides such as indium tin oxide coated glass, metal, and ceramics.

The inventors have learned that a variety of parameters that must be controlled to ensure successful formation of a hermetic seal or feedthrough. Such parameters include temperature to which the substrates and enamels are heated, temperature homogeneity within and across the substrates and enamels, and the time of firing. Relative to the compositions, important factors include: the formulation of the paste glass(es); inorganic additives, thermal conductivity, thermal diffusivity, thermal expansion and flow temperatures of the enamels, the rheology of the paste(s); the cross-section of a printed paste or conductive trace (a rectangular cross-section being preferred); the absorbance of each layer (substrate(s)); the power input of the firing device;

Details about aspects of the invention can be found in one or more of the following United States Patent Applications, all of which are commonly owned, and all of which are incorporated herein by reference: Ser. Nos. 10/864,304; 10/988,208; 11/131,919; 11/145,538; 11/384,838; 11/774,632; 11/846,552; 12/097,823; 12/298,956; 12/573,209; 61/324,356; 61/328,258; 61/366,568; and 61/366,578.

The term "comprising" provides support for "consisting essentially of" and "consisting of". It is envisioned that an individual numerical value for a parameter, temperature, weight, percentage, etc., disclosed herein in any fours, such as presented in a table, provides support for the use of such value as the endpoint of a range. A range may be bounded by two such values. In a single embodiment, more than one glass frit composition can be used, and compositions comprising amounts and ranges from different columns among the tables are also envisioned.

Certain embodiments of the invention are envisioned where at least some percentages, temperatures, times, and ranges of other values are preceded by the modifier "about." All compositional percentages are by weight and are given for a blend prior to firing. Numerical ranges of oxides or other ingredients that are bounded by zero on the lower end (for example, 0-10 mole % ZnO) are intended to provide support for the concept "up to [the upper limit]," for example "up to 10 mole % $ZrO_2$" as well as a positive recitation that the ingredient in question is present in an amount that does not exceed the upper limit.

Each numerical range disclosed herein that is bounded by zero, has, as an alternative embodiment, a lower bound of 0.1% instead of zero. All ranges disclosed herein are to be understood to encompass the beginning and ending range values and any and all subranges therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 2.7, 3.3 to 8.9, 5.7 to 10, or individual values like 3.14159, 5.17, 8.06 or 9.53 for example. In other words, ranges are used as shorthand for describing each and every value that is within the range. Any value within the range can be selected as a terminus of a subrange within the range.

The invention claimed is:

1. A method of sealing at least two inorganic substrates together using an induction energy source comprising:
   a. providing at least two inorganic substrates;
   b. applying to at least one of the at least two substrates a paste composition including:
      i. a glass frit, and
      ii. an induction coupling additive,
      iii. a manganese-containing constituent selected from the group consisting of bismuth manganese pigments, perovskite manganites, $Bi_2Mn_4O_{10}$, $Bi_{12}MnO_{20}$ and a bismuth-manganese pigment having a mole ratio of $Bi_2O_3$ to $MnO_2$ of 5:1 to 1:5,
   c. prefiring the paste composition on the substrate,
   d. bringing at least a second substrate into contact with the paste composition, and
   e. subjecting the substrates and paste composition to induction heating, thereby forming a hermetic seal between the two inorganic substrates.

2. The method of claim 1, wherein the glass frit is selected from the group consisting of bismuth glass, lead glass, zinc glass, barium glass, calcium glass, alkali silicate glasses, vanadium glass, telluride glass, phosphate glass and combinations thereof.

3. The method of claim 1, wherein the induction coupling additive is selected from the group consisting of ferrites, Ni—Zn ferrites, Mn—Zn ferrites, Mg—Mn ferrites, ferritic stainless steel, 430 stainless steel, copper, aluminum, silver, ferromagnetic materials, $Fe_3O_4$, $Fe_2O_3$ glasses, $Fe_2O_3$ glass-ceramics, $Co_2O_3$ glasses, $Co_2O_3$ glass-ceramics, MnO glasses, MnO-glass ceramics, $MgO_{0.5}MnO_{0.5}Fe_2O_3$ and combinations thereof.

4. The method of claim 1, wherein a vacuum or inert atmosphere is sealed in a cavity bounded by the at least two inorganic substrates and a seal formed by the induction heating of the paste.

5. The method of claim 1, wherein the glass frit is a lead-free and cadmium-free sealing glass composition, comprising, prior to firing,
   a. 25-65 mol % $Bi_2O_3$,
   b. 3-60 mol % ZnO
   c. 4-65 mol % $B_2O_3$,
   d. 0.1-15 mol % of at least one selected from the group consisting of CuO, $Fe_2O_3$, $Co_2O_3$, $Cr_2O_3$, and combinations thereof,
   e. no intentionally added oxides of silicon, and
   f. no intentionally added oxides of aluminum.

6. The method of claim 5, wherein the induction coupling additive is selected from the group consisting of ferrites, Ni—Zn ferrites, Mn—Zn ferrites, Mg—Mn ferrites, ferritic stainless steel, 430 stainless steel, copper, aluminum, silver, ferromagnetic materials, $Fe_3O_4$, $Fe_2O_3$ glasses, $Fe_2O_3$ glass-ceramics, $Co_2O_3$ glasses, $Co_2O_3$ glass-ceramics, MnO glasses, MnO-glass ceramics, $MgO_{0.5}MnO_{0.5}Fe_2O_3$ and combinations thereof.

7. The method of claim 5, wherein a vacuum or inert atmosphere is sealed in a cavity bounded by the at least two inorganic substrates and the seal formed by the induction heating of the paste.

8. The method of claim 1, wherein the glass frit is a lead-free and cadmium-free sealing glass composition, comprising, prior to firing,
   a. 5-65 mol % ZnO,
   b. 10-65 mol % $SiO_2$,
   c. 5-55 mol % $B_2O_3+Al_2O_3$,
   d. 0.1-45 mol % of at least one selected from the group consisting of $Li_2O$, $Na_2O$, $K_2O$, $Cs_2O$, and combinations thereof,
   e. 0.1-20 mol % of at least one selected from the group consisting of MgO, CaO, BaO, SrO and combinations thereof, and
   f. 0.1-40 mol % of at least one selected from the group consisting of $TeO_2$, $Tl_2O$, $V_2O_5$, $Ta_2O_5$, $GeO_2$ and combinations thereof.

9. The method of claim 8, wherein the induction coupling additive is selected from the group consisting of ferrites, Ni—Zn ferrites, Mn—Zn ferrites, Mg—Mn ferrites, ferritic stainless steel, 430 stainless steel, copper, aluminum, silver, ferromagnetic materials, $Fe_3O_4$, $Fe_2O_3$ glasses, $Fe_2O_3$ glass-ceramics, $Co_2O_3$ glasses, $Co_2O_3$ glass-ceramics, MnO glasses, MnO-glass ceramics, $MgO_{0.5}MnO_{0.5}Fe_2O_3$ and combinations thereof.

10. The method of claim 8, wherein a vacuum or inert atmosphere is sealed in a cavity bounded by the at least two inorganic substrates and the seal formed by the induction heating of the paste.

11. The method of claim 1, wherein the glass frit is a lead-free and cadmium-free sealing glass composition, comprising, prior to firing,
    a. 5-55 mol % $Li_2O+Na_2O+K_2O$,
    b. 2-26 mol % $TiO_2$,
    c. 5-75 mol % $B_2O_3+SiO_2$,
    d. 0.1-30 mol % of at least one selected from the group consisting of $V_2O_5$, $Sb_2O_5$, $P_2O_5$, and combinations thereof,
    e. 0.1-20 mol % of at least one selected from the group consisting of MgO, CaO, BaO, SrO, and combinations thereof,
    f. 0.1-40 mol % of at least one selected from the group consisting of $TeO_2$, $Tl_2O$, $Ta_2O_5$, $GeO_2$ and combinations thereof, and
    g. 0.1-20 mol % F.

12. The method of claim 11, wherein the induction coupling additive is selected from the group consisting of ferrites, Ni—Zn ferrites, Mn—Zn ferrites, Mg—Mn ferrites, ferritic stainless steel, 430 stainless steel, copper, aluminum, silver, ferromagnetic materials, $Fe_3O_4$, $Fe_2O_3$ glasses, $Fe_2O_3$ glass-ceramics, $Co_2O_3$ glasses, $Co_2O_3$ glass-ceramics, MnO glasses, MnO-glass ceramics, $MgO_{0.5}MnO_{0.5}Fe_2O_3$ and combinations thereof.

13. The method of claim 11, wherein a vacuum or inert atmosphere is sealed in a cavity bounded by the at least two inorganic substrates and a seal formed by the induction heating of the paste.

14. The method of claim 1, wherein:
    the paste composition is applied to two inorganic substrates,
    the method further comprises applying a metal foil between the paste composition of the two substrates,
    step e includes subjecting the metal foil to induction heating, and
    the hermetic seal includes the metal foil.

15. The method of claim 1, wherein the hermetic seal includes a conductive circuit feed-through.

16. A method of sealing at least two inorganic substrates together using an induction energy source comprising:
    a. providing at least two inorganic substrates;
    b. applying to at least one of the at least two substrates a paste composition including:
       i. a glass frit, and
       ii. an induction coupling additive, c. prefiring the paste composition on the substrate,
d. bringing at least a second substrate into contact with the paste composition, and
e. subjecting the substrates and paste composition to induction heating, thereby forming a hermetic seal between the two inorganic substrates, wherein the glass frit is a lead-free and cadmium-free sealing glass composition comprising, prior to firing, I. 25-65 mol % $Bi_2O_3$,
II. 3-60 mol % ZnO
III. 4-65 mol % $B_2O_3$,
IV. 0.1-15 mol % of at least one selected from the group consisting of CuO, $Fe_2O_3$, $Co_2O_3$, $Cr_2O_3$, and combinations thereof,
V. no intentionally added oxides of silicon,
VI. no intentionally added oxides of aluminum, and
VII. a manganese-containing constituent selected from the group consisting of bismuth manganese pigments, perovskite manganites, $Bi_2Mn_4O_{10}$, $Bi_{12}MnO_{20}$ and a bismuth-manganese pigment having a mole ratio of $Bi_2O_3$ to $MnO_2$ of 5:1 to 1:5.

* * * * *